(12) United States Patent
Sugai et al.

(10) Patent No.: US 9,742,951 B2
(45) Date of Patent: Aug. 22, 2017

(54) LENS UNIT, IMAGE READING DEVICE, AND IMAGE FORMING APPARATUS

(71) Applicants: Atsushi Sugai, Kanagawa (JP); Tsuyoshi Fujimoto, Kanagawa (JP)

(72) Inventors: Atsushi Sugai, Kanagawa (JP); Tsuyoshi Fujimoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/527,988

(22) Filed: Oct. 30, 2014

(65) Prior Publication Data

US 2015/0131173 A1 May 14, 2015

(30) Foreign Application Priority Data

Nov. 12, 2013 (JP) ................. 2013-234026

(51) Int. Cl.
*G02B 9/04* (2006.01)
*H04N 1/028* (2006.01)
*G02B 7/02* (2006.01)

(52) U.S. Cl.
CPC ............ *H04N 1/028* (2013.01); *G02B 7/021* (2013.01); *G02B 7/025* (2013.01); *G02B 7/028* (2013.01); *H04N 2201/0081* (2013.01); *H04N 2201/0094* (2013.01); *H04N 2201/02431* (2013.01); *H04N 2201/02458* (2013.01)

(58) Field of Classification Search
CPC ................................ G02B 13/16; G02B 13/18
USPC ................................ 359/793, 802, 649, 651
See application file for complete search history.

(56) References Cited

U.S. PATENT DOCUMENTS

| | | | | |
|---|---|---|---|---|
| 4,067,650 | A | * | 1/1978 | Spence-Bate .................. 355/20 |
| 4,803,352 | A | * | 2/1989 | Bierleutgeb .................. 250/201.3 |
| 6,128,077 | A | * | 10/2000 | Jovin et al. ................... 356/310 |
| 2004/0169922 | A1 | * | 9/2004 | Wilson et al. ................ 359/462 |
| 2007/0091317 | A1 | * | 4/2007 | Freischlad et al. ........... 356/511 |
| 2007/0139541 | A1 | * | 6/2007 | Fein et al. .................... 348/294 |
| 2008/0062530 | A1 | | 3/2008 | Hayashide et al. |
| 2008/0099661 | A1 | * | 5/2008 | Virag et al. ................... 250/201.3 |
| 2010/0110571 | A1 | * | 5/2010 | Ono et al. ..................... 359/824 |
| 2012/0044514 | A1 | | 2/2012 | Sugai |
| 2012/0140111 | A1 | | 6/2012 | Hayashide et al. |
| 2013/0135859 | A1 | | 5/2013 | Inoue et al. |
| 2013/0141766 | A1 | | 6/2013 | Iwamatsu et al. |
| 2013/0222865 | A1 | | 8/2013 | Iwamatsu et al. |
| 2013/0293932 | A1 | | 11/2013 | Sugai et al. |
| 2014/0071501 | A1 | | 3/2014 | Shinkawa et al. |
| 2014/0078560 | A1 | | 3/2014 | Nagao et al. |
| 2014/0233077 | A1 | | 8/2014 | Iwamatsu et al. |

FOREIGN PATENT DOCUMENTS

| | | |
|---|---|---|
| JP | 4994753 | 5/2012 |
| JP | 2012-137751 | 7/2012 |
| JP | 2013-054295 | 3/2013 |

* cited by examiner

*Primary Examiner* — James Greece
(74) *Attorney, Agent, or Firm* — Harness, Dickey & Pierce P.L.C.

(57) ABSTRACT

A lens unit includes a tube lens; a single lens arranged at a downstream side with respect to the tube lens in an optical incidence direction; and a supporting member that supports the tube lens and the single lens. Reflection light from a document is condensed on an image sensor by the tube lens and the single lens to form an image. An end surface part, not facing the tube lens, of the single lens is in direct contact with the supporting member.

5 Claims, 4 Drawing Sheets

LENS UNIT, IMAGE READING DEVICE, AND IMAGE FORMING APPARATUS

CROSS-REFERENCE TO RELATED APPLICATION

The present application claims priority to and incorporates by reference the entire contents of Japanese Patent Application No. 2013-234026 filed in Japan on Nov. 12, 2013.

BACKGROUND OF THE INVENTION

1. Field of the Invention

The present invention relates to a lens unit that forms an image of image information of a document on an image sensor, and an image reading device including the lens unit, and an image forming apparatus including the image reading device.

2. Description of the Related Art

An image forming apparatus such as a copying machine, a printer, a facsimile machine, and a multifunction peripheral is provided with a lens unit that forms an image of image information of a document on an image sensor.

Conventionally known has been an image reading lens (lens unit) which is provided with a lens group including a plurality of lenses and a single lens arranged at a distance from the lens group as disclosed in Japanese Laid-open Patent Publication No. 2013-54295, for example. This lens unit has an advantage of preventing a degradation of lens characteristics such as a resolution while making a conjugation length short and diameters of lenses small because of the distance between the lens group and the single lens.

Besides, known has been another lens unit provided with a tube part (tube lens) including at least one lens, a single lens arranged to be in contact with the tube part, and an elastic member that depresses the single lens to the tube lens as disclosed in Japanese Patent No. 4994753, for example.

However, Japanese Laid-open Patent Publication No. 2013-54295 does not disclose anything about how to support the lens group and the single lens.

There is a limitation in trying to make a conjugation length short and an angle of view wide in the lens unit disclosed in Japanese Patent No. 4994753 since the tube lens and the single lens are in contact and a distance between the tube lens and the single lens cannot be extended.

A method of making the tube lens and the single lens supported by a board can be considered to extend the distance between the tube lens and the single lens. However, the board as well as the lenses would have a thermal deformation caused by changes in temperature and the distance between the tube lens and the single lens would thereby be extended and contracted in the method, leading to a concern about a degradation of lens characteristics such as a resolution.

Therefore, there is a need for a lens unit capable of suppressing the extension and contraction, caused by changes in temperature, of the distance between the tube lens and the single lens.

SUMMARY OF THE INVENTION

It is an object of the present invention to at least partially solve the problems in the conventional technology.

According to an embodiment, there is provided a lens unit that includes a tube lens; a single lens arranged at a downstream side with respect to the tube lens in an optical incidence direction; and a supporting member that supports the tube lens and the single lens. Reflection light from a document is condensed on an image sensor by the tube lens and the single lens to form an image. An end surface part, not facing the tube lens, of the single lens is in direct contact with the supporting member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings.

Figure 1:
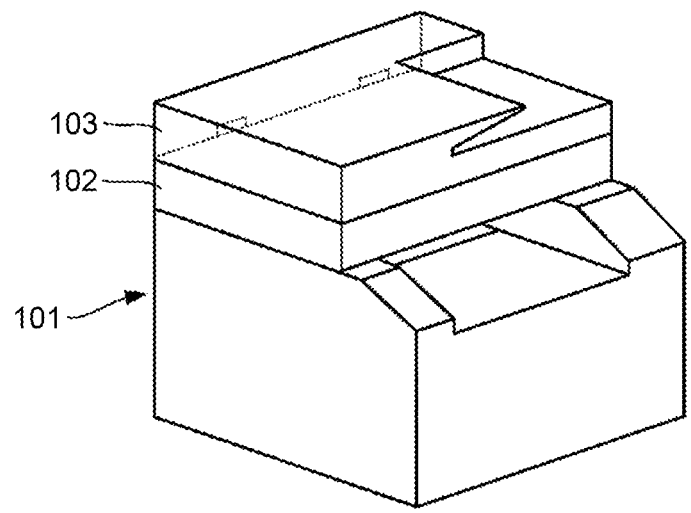
FIG. 1 is a perspective view of an image forming apparatus to which a lens unit according to an embodiment of the present invention is applied.

As illustrated in FIG. 1, an image forming apparatus 101 according to an embodiment is provided with an image reading device 102 and a document conveying device 103 which is mounted on an upper part of the image reading device 102.

Figure 2:
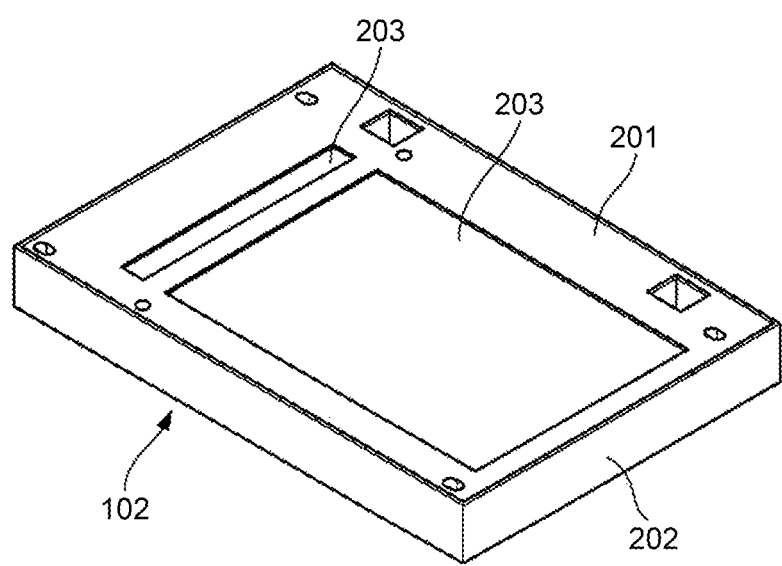
FIG. 2 is a perspective view of an image reading device to which the lens unit according to the embodiment of the present invention is applied.
Figure 3:
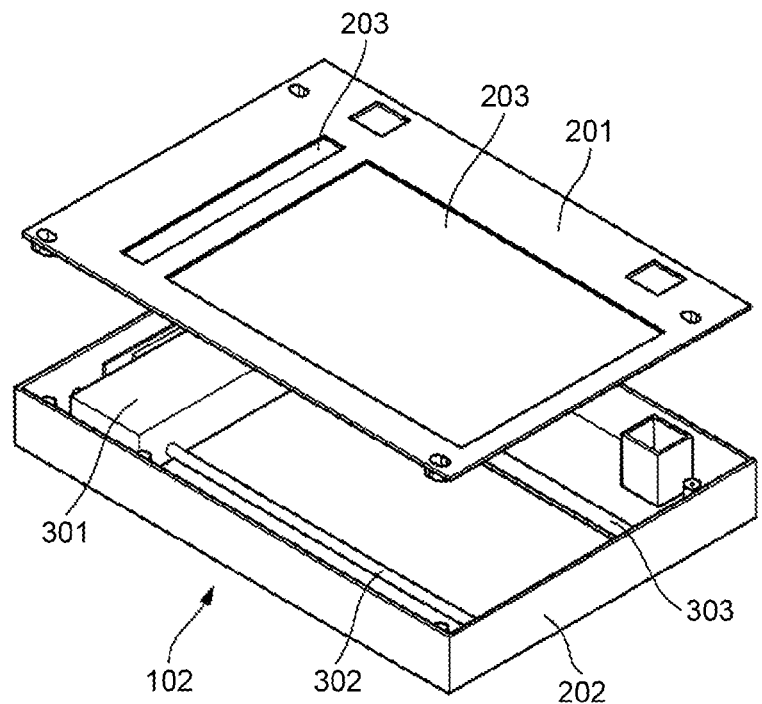
FIG. 3 is an exploded perspective view of the image reading device illustrated in FIG. 2.

As illustrated in FIGS. 2 and 3, the image reading device 102 is configured to include a scanner cover part 201, a scanner frame part 202, a contact glass 203, an integrated scanning optical unit 301, a guide rod 302, and a rail 303.

The scanner cover part 201, which has a rectangular planar shape, is fixed in a state of being fitted in an upper edge part of the scanner frame part 202 of a quadrangular frame shape. The scanner cover part 201 supports the contact glass 203 on which a document (not-illustrated) is placed.

The integrated scanning optical unit 301, which is arranged at an inner side of the scanner frame part 202, is configured to be reciprocated horizontally along the guide rod 302 and the rail 303 which are attached to the scanner frame part 202.

Figure 4:
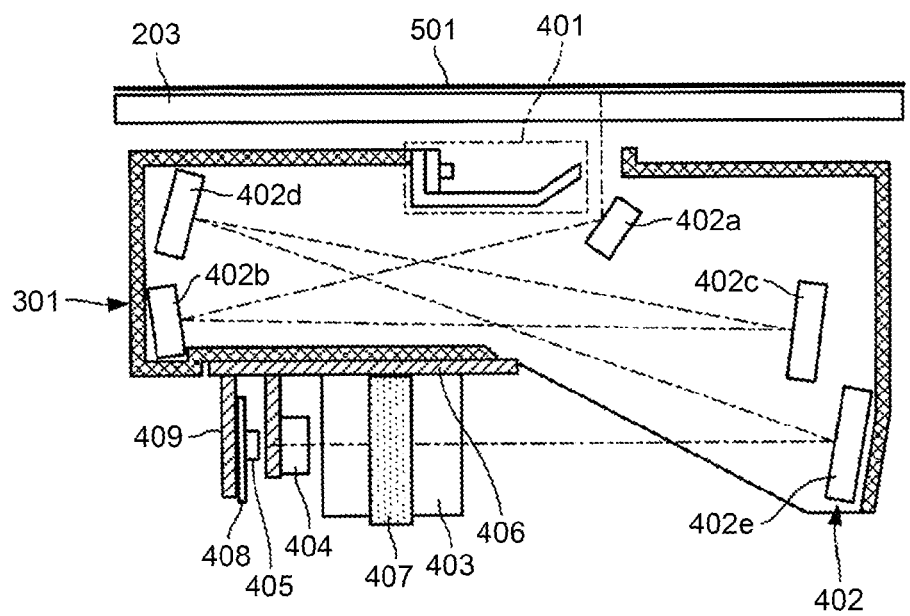
FIG. 4 is a longitudinal sectional view of an integrated scanning optical unit illustrated in FIG. 3.

As illustrated in FIG. 4, the integrated scanning optical unit 301 is provided with a point light source 401, a mirror group 402, a tube lens 403, a single lens 404, an image sensor 405, and a board 406.

The point light source 401 is configured to radiate a light towards a document 501 placed on the contact glass 203. The mirror group 402, which includes a plurality of mirrors 402a, 402b, 402c, 402d, and 402e, is configured to make a reflection light from the document 501 come into the tube lens 403 and the single lens 404 to guide the light to the image sensor 405.

The tube lens 403, which includes at least one lens, is fixed to the board 406 by a lens band 407. The single lens 404, which locates at a downstream side with respect to the tube lens 403 in an optical incidence direction, is bonded and fixed to the board 406. The tube lens 403 and the single lens 404 are configured to form an image on the image sensor 405 from the reflection light reflected by the mirror group 402.

The image sensor 405, which is mounted on a substrate 408, is attached to the board 406 via a position adjusting bracket 409. For the image sensor 405, a CCD image sensor, a CMOS image sensor, and the like are used.

The tube lens 403, the single lens 404, the board 406, and the lens band 407 constitute a lens unit whose details will be explained later. The lens unit may be applied not only to the integrated scanning optical unit 301 illustrated in FIGS. 3 and 4 but also to an image reading device of a differential mirror system.

Figure 5:
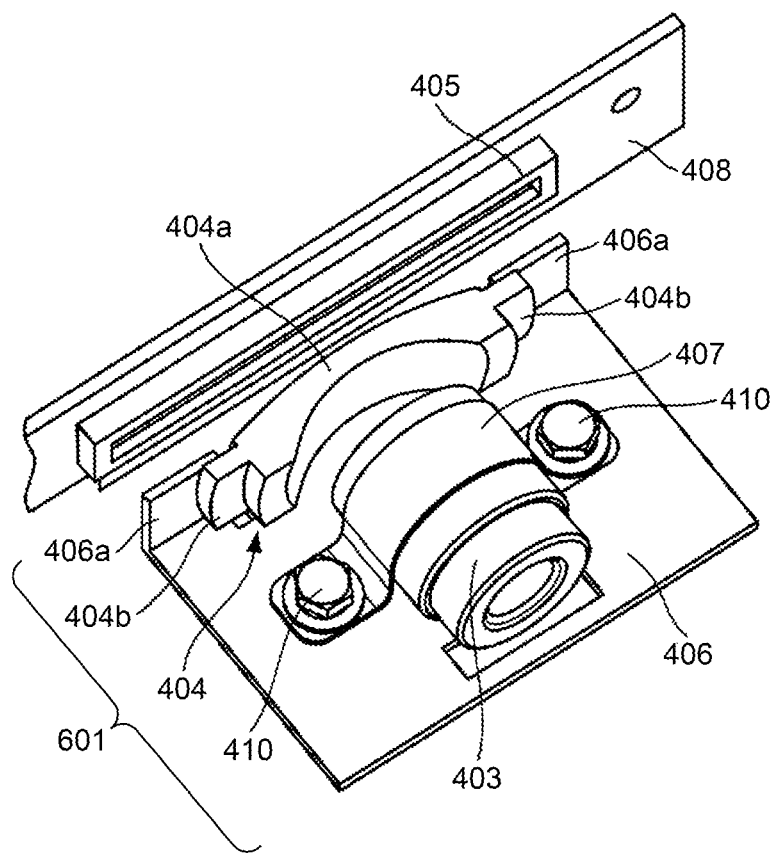
FIG. 5 is a perspective view of a lens unit according to a first embodiment of the present invention.

As illustrated in FIG. 5, a lens unit 601, which is provided with the tube lens 403, the single lens 404, the board 406, and the lens band 407, according to a first embodiment of the present invention is configured to form an image on the image sensor 405 from the reflection light from the document. Here, FIG. 5 illustrates a state where the top and the bottom in FIG. 4 are inverted.

The tube lens 403 is fixed to the board 406 by the lens band 407 extending in a circumferential direction of the tube lens 403 and by bolts 410 that enable fastening both end parts of the lens band 407 to the board 406.

The single lens 404, which is a non-circular lens, locates at a downstream side with respect to the tube lens 403 in the optical incidence direction. The single lens 404 includes a pair of protruding parts 404b that protrude outwards from one side end part and the other side end part of an optical part 404a through which the reflection light transmits. The protruding parts 404b are non-optical parts locating out of an optical path of the reflection light.

The board 406 includes a pair of flange parts 406a at a side closer to the image sensor 405 than the position where the tube lens 403 is fixed. The flange parts 406a are configured to be in direct contact with end surface parts, not facing the tube lens 403, of the protruding parts 404b. The flange parts 406a and the end surface parts, not facing the tube lens 403, of the protruding parts 404b are fixed by adhesive bonding.

An actuation of the lens unit 601 will be explained below.

When the board 406 expands due to a change in temperature, the flange parts 406a move relatively to a direction away from the tube lens 403 in the lens unit 601. When the single lens 404 and the protruding parts 404b expand due to a change in temperature, an entirety of the optical part 404a of the single lens 404 moves relatively to a direction closer to the tube lens 403 in the lens unit 601.

When the board 406 contracts due to a change in temperature, the flange parts 406a move relatively to the direction closer to the tube lens 403 in the lens unit 601. When the single lens 404 and the protruding parts 404b contract due to a change in temperature, the entirety of the optical part 404a of the single lens 404 moves relatively to the direction away from the tube lens 403 in the lens unit 601.

In the lens unit 601 according to the embodiment, the flange parts 406a of the board 406 is in direct contact with the end surface parts, not facing the tube lens 403, of the protruding parts 404b. Therefore, the movement of the flange parts 406a due to the expansion and the contraction of the board 406 is offset by the movement of the optical part 404a due to the expansion and the contraction of the protruding parts 404b in the lens unit 601 according to the embodiment.

Hence, the expansion and the contraction, caused by changes in temperature, of the distance between the tube lens 403 and the single lens 404 can be suppressed and lens characteristics such as a resolution do not degrade in the lens unit 601 according to the embodiment.

It is possible in the lens unit 601 according to the embodiment to adjust an amount of the movement, caused by changes in temperature, of the optical part 404a of the single lens 404 depending on a dimension of the protruding parts 404b in the optical incidence direction.

Moreover, the flange parts 406a and the protruding parts 404b are mutually fixed by adhesive bonding in the lens unit 601 according to the embodiment. Therefore, it is possible in the lens unit 601 according to the embodiment to adjust a relative position of a central axis of the single lens 404 with respect to a central axis of the tube lens 403 in bonding.

Figure 6:
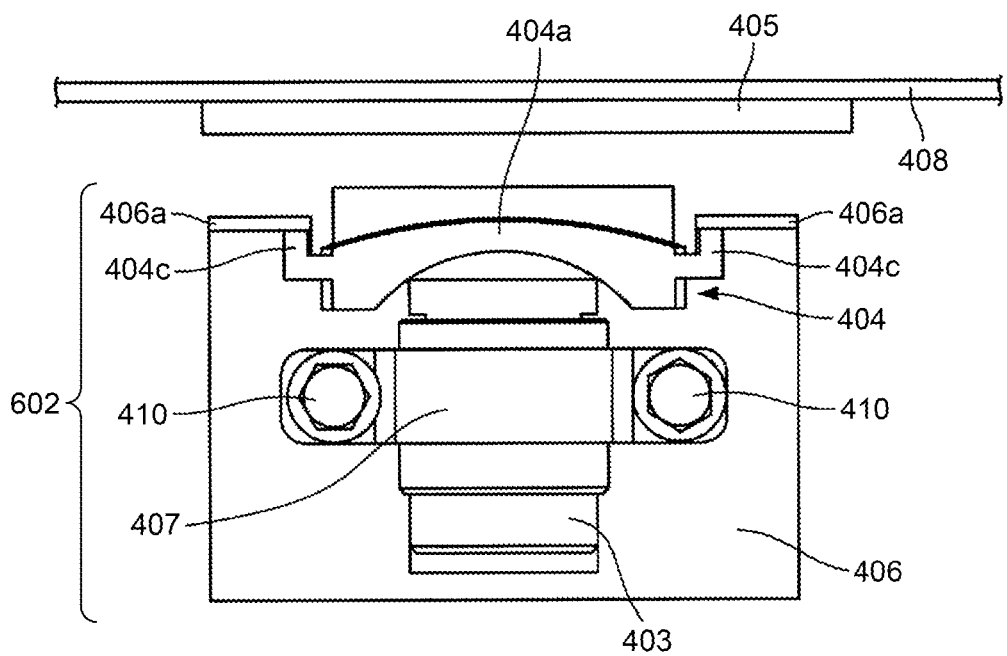
FIG. 6 is a plane view of a lens unit according to a second embodiment of the present invention.

As illustrated in FIG. 6, a lens unit 602, which is provided with the tube lens 403, a single lens 404, the board 406, and the lens band 407, according to a second embodiment of the present invention is configured to form an image on the image sensor 405 from the reflection light from the document. Here, FIG. 6 illustrates a state where the top and the bottom in FIG. 4 are inverted. In FIG. 6, parts denoted by the same reference symbols as FIG. 5 are identical.

The single lens 404 in the lens unit 602 includes a pair of protruding parts 404c that protrude outwards from one side end part and the other side end part of the optical part 404a through which the reflection light transmits and whose tip end parts extend to the downstream side in the optical incidence direction. The protruding parts 404c are non-optical parts locating out of the optical path of the reflection light.

The flange parts 406a of the board 406 are configured to be in direct contact with the tip end parts of the protruding parts 404c. The flange parts 406a and tip end surface parts of the protruding parts 404c are fixed by adhesive bonding.

An actuation of the lens unit 602 will be explained below.

When the board 406 expands due to a change in temperature, the flange parts 406a move relatively to the direction away from the tube lens 403 in the lens unit 602. When the single lens 404 and the protruding parts 404c expand due to a change in temperature, an entirety of the optical part 404a of the single lens 404 moves relatively to the direction closer to the tube lens 403 in the lens unit 602.

When the board 406 contracts due to a change in temperature, the flange parts 406a move relatively to the direction closer to the tube lens 403 in the lens unit 602. When the single lens 404 and the protruding parts 404c contract due to a change in temperature, the entirety of the optical part 404a of the single lens 404 moves relatively to the direction away from the tube lens 403 in the lens unit 602.

In the lens unit 602 according to the embodiment, the flange parts 406a of the board 406 are in direct contact with the tip end surface parts of the protruding parts 404c. Therefore, the movement of the flange parts 406a due to the expansion and the contraction of the board 406 is offset by the movement of the optical part 404a due to the expansion and the contraction of the protruding parts 404c in the lens unit 602 according to the embodiment.

Hence, the expansion and the contraction, cause by changes in temperature, of the distance between the tube lens 403 and the single lens 404 can be suppressed and lens characteristics such as a resolution do not degrade in the lens unit 602 according to the embodiment.

It is possible in the lens unit 602 according to the embodiment to adjust an amount of the movement, caused by changes in temperature, of the optical part 404a of the single lens 404 depending on the dimension of the protruding parts 404c in the optical incidence direction.

Moreover, the flange parts 406a and the protruding parts 404c are mutually fixed by adhesive bonding in the lens unit 602 according to the embodiment. Therefore, it is possible in the lens unit 602 according to the embodiment to adjust a relative position of the central axis of the single lens 404 with respect to the central axis of the tube lens 403 in bonding.

Figure 7:
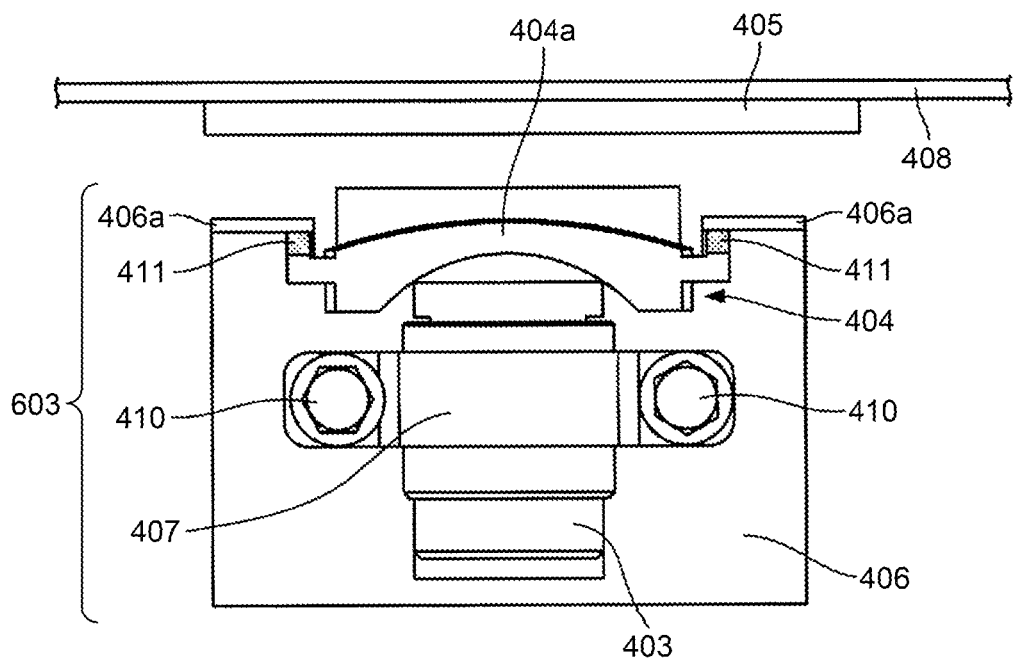
FIG. 7 is a plane view of a lens unit according to a third embodiment of the present invention.

As illustrated in FIG. 7, a lens unit 603 according to a third embodiment of the present invention is provided with the tube lens 403, a single lens 404, the board 406, the lens band 407, and a distance adjusting member 411. The lens unit 603 is configured to form an image on the image sensor 405 from the reflection light from the document. Here, FIG. 7 illustrates a state where the top and the bottom in FIG. 4 are inverted. In FIG. 7, parts denoted by the same reference symbols as FIG. 5 are identical.

The single lens 404 in the lens unit 603 includes the pair of protruding parts 404b, similarly to the lens unit 601. The distance adjusting member 411 has a linear expansion coefficient which is different from the single lens 404.

The flange parts 406a of the board 406 are configured to be in direct contact with the end surface parts, not facing the tube lens 403, of the protruding parts 404b via the distance adjusting member 411. Specifically, the distance adjusting member 411 is sandwiched by the flange parts 406a and the protruding parts 404b. The flange parts 406a and the distance adjusting member 411, and the distance adjusting member 411 and the end surface parts, not facing the tube lens 403, of the protruding parts 404b are fixed by adhesive bonding.

An actuation of the lens unit 603 will be explained below.

When the board 406 expands due to a change in temperature, the flange parts 406a move relatively to the direction away from the tube lens 403 in the lens unit 603. When the single lens 404 and the protruding parts 404b expand due to a change in temperature, the entirety of the optical part 404a of the single lens 404 moves relatively to the direction closer to the tube lens 403 in the lens unit 603.

When the distance adjusting member 411 expands due to a change in temperature, the distance between the flange parts 406a and the protruding parts 404b becomes large in the lens unit 603.

When the board 406 contracts due to a change in temperature, the flange parts 406a move relatively to the direction closer to the tube lens 403 in the lens unit 601. When the single lens 404 and the protruding parts 404b contract due to a change in temperature, the entirety of the optical part 404a of the single lens 404 moves relatively to the direction away from the tube lens 403 in the lens unit 601.

When the distance adjusting member 411 contracts due to a change in temperature, the distance between the flange parts 406a and the protruding parts 404b becomes short in the lens unit 603.

In the lens unit 603 according to the embodiment, the flange parts 406a of the board 406 are in direct contact with the end surface parts, not facing the tube lens 403, of the protruding parts 404b via the distance adjusting member 411. Therefore, the movement of the flange parts 406a due to the expansion and the contraction of the board 406 is offset by the movement of the optical part 404a due to the expansion and the contraction of the protruding parts 404b in the lens unit 603 according to the embodiment.

Hence, the expansion and the contraction, cause by changes in temperature, of the distance between the tube lens 403 and the single lens 404 can be suppressed and lens characteristics such as a resolution do not degrade in the lens unit 603 according to the embodiment.

It is possible in the lens unit 603 according to the embodiment to adjust an amount of the movement, caused by changes in temperature, of the optical part 404a of the single lens 404 depending on the dimension of the protruding parts 404b in the optical incidence direction.

The distance adjusting member 411 whose linear expansion coefficient is different from the single lens 404 is sandwiched between the flange parts 406a and the protruding parts 404b in the lens unit 603 according to the embodiment. Therefore, it is possible in the lens unit 603 according to the embodiment to more finely control fluctuation, caused by changes in temperature, in distance between the tube lens 403 and the single lens 404.

Moreover, the flange parts 406a and the distance adjusting member 411, and the distance adjusting member 411 and the protruding parts 404b are mutually fixed by adhesive bonding in the lens unit 603 according to the embodiment. Therefore, it is possible in the lens unit 603 according to the embodiment to adjust the relative position of the central axis of the single lens 404 with respect to the central axis of the tube lens 403 in bonding.

The present invention is not limited to the embodiments, and the image reading device and the image forming apparatus to which the lens unit is applied may be a facsimile machine and a multifunction peripheral including a plurality of functions.

According to the embodiments described above, it is possible to provide a lens unit capable of suppressing an extension and a contraction, caused by changes in temperature, of a distance between a tube lens and a single lens.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lens structure comprising:
   a board having a pair of flanges, the pair of flanges being on opposite sides of the board; and
   a plurality of lenses including at least a tube lens and a single lens attached to the board, the single lens arranged downstream from the tube lens on an optical axis of the tube lens and the single lens, and the single lens having protruding parts on opposite sides of the single lens attached to the pair of flanges such that the board supports the tube lens and the single lens, the tube lens and the single lens configured to condense at least a portion of reflection light reflected from an object on an image sensor such that an image is formed by the portion of the reflection light that sequentially passes through the tube lens and the single lens.

2. The lens structure according to claim 1, wherein the flanges are at one end of the board.

3. The lens structure according to claim 1, wherein the protruding part is in contact with the flanges via a distance adjusting member, the distance adjusting member being attached to the flanges via adhesive bonding.

4. The lens structure according to claim 3, wherein the distance adjusting member has a linear expansion coefficient that is different from the single lens.

5. The lens structure according to claim 1, wherein the flanges are perpendicular with respect to a surface of the board to which the tube lens and the single lens are attached.

\* \* \* \* \*